(12) United States Patent
Lu et al.

(10) Patent No.: US 11,477,576 B2
(45) Date of Patent: Oct. 18, 2022

(54) INJECTION MOLDING METHOD FOR PRODUCT WITH ELASTIC CONNECTION SHEET, AND LOUDSPEAKER AND ELECTRONIC APPARATUS

(71) Applicant: Goertek, Inc., Weifang (CN)

(72) Inventors: Lulu Lu, Weifang (CN); Zhibing Zhang, Weifang (CN)

(73) Assignee: Goertek, Inc., Weifang (CN)

( * ) Notice: Subject to any disclaimer, the term of this patent is extended or adjusted under 35 U.S.C. 154(b) by 463 days.

(21) Appl. No.: 16/493,191

(22) PCT Filed: Jun. 14, 2017

(86) PCT No.: PCT/CN2017/088319
§ 371 (c)(1),
(2) Date: Sep. 11, 2019

(87) PCT Pub. No.: WO2018/176635
PCT Pub. Date: Oct. 4, 2018

(65) Prior Publication Data
US 2020/0015018 A1    Jan. 9, 2020

(30) Foreign Application Priority Data

Mar. 30, 2017    (CN) .......................... 201710203920.7

(51) Int. Cl.
*H04R 9/02* (2006.01)
*H04R 9/06* (2006.01)
(Continued)

(52) U.S. Cl.
CPC ................. *H04R 9/02* (2013.01); *H04R 9/06* (2013.01); *H04R 31/006* (2013.01);
(Continued)

(58) Field of Classification Search
None
See application file for complete search history.

(56) References Cited

U.S. PATENT DOCUMENTS

| 4,880,591 | A | 11/1989 | Baba |
| 8,662,942 | B2 | 3/2014 | Li |
| 2018/0041844 | A1* | 2/2018 | Shan ........................ H04R 9/04 |

FOREIGN PATENT DOCUMENTS

| CN | 102263351 A | 11/2011 |
| CN | 204046825 U | 12/2014 |

(Continued)

*Primary Examiner* — Timothy Kennedy
*Assistant Examiner* — Olukorede Esan
(74) *Attorney, Agent, or Firm* — Baker Botts, L.L.P.

(57) ABSTRACT

An injection molding method for a product with a connection elastic sheet, a loudspeaker and an electronic device are provided. The method comprises: providing a blank material comprising at least one connection piece and a material connection strip, and each connection piece comprising an elastic arm portion and a wire portion; positioning the blank material as an insert in a first injection mold by means of the material connection strip; injecting a first injection plastic part into the first injection cavity to obtain a first injection product; processing the first injection product for bending up the elastic arm portion toward an outer surface of the first injection plastic part; placing the processed first injection product into a second injection cavity of a second injection mold, and sealing the elastic arm portion; and injecting a second injection plastic part into the second injection cavity.

6 Claims, 4 Drawing Sheets

(51) Int. Cl.
*H04R 31/00* (2006.01)
*B29L 31/34* (2006.01)
*B29C 45/14* (2006.01)

(52) U.S. Cl.
CPC .................. *B29C 45/14065* (2013.01); *B29C 2045/14131* (2013.01); *B29C 2045/14139* (2013.01); *B29L 2031/3418* (2013.01); *B29L 2031/3481* (2013.01); *H04R 2231/003* (2013.01)

(56) References Cited

FOREIGN PATENT DOCUMENTS

| | | | | | |
|---|---|---|---|---|---|
| CN | 104869508 A | * | 8/2015 | .............. | H04R 9/04 |
| CN | 204616075 U | | 9/2015 | | |
| WO | WO2015/085789 A1 | | 6/2015 | | |

* cited by examiner

INJECTION MOLDING METHOD FOR PRODUCT WITH ELASTIC CONNECTION SHEET, AND LOUDSPEAKER AND ELECTRONIC APPARATUS

CROSS-REFERENCE TO RELATED APPLICATIONS

This application is a National Stage of International Application No. PCT/CN2017/088319, filed on Jun. 14, 2017, which claims priority to Chinese Patent Application No. 201710203920.7, filed on Mar. 30, 2017, both of which are hereby incorporated by reference in their entireties.

TECHNICAL FIELD

The present disclosure relates to the technical field of injection molding processes, and more particularly, to an injection molding method for a product with a connection elastic sheet, a speaker, and an electronic device.

BACKGROUND

A connection elastic sheet is an electrical connection piece for electrical contact connection. Taking a speaker as an example, the speaker may be provided with a connection elastic sheet, so that when the speaker is mounted in an electronic device such as a mobile phone, a voice coil of the speaker can be connected to an external circuit by means of a structure in which the connection elastic sheet is in electrical contact with a bonding pad of a PCB.

At present, there are two methods for arranging the connection elastic sheet in a product. In one method, the connection elastic sheet is used as an insert in injection molding of a product. However, in this method, for positioning and sealing the connection elastic sheet in a mold, the connection elastic sheet only can be arranged at an edge of the product due to the structure limit of the mold. As a result, the position of a corresponding connecting area arranged on the PCB is limited, and an electronic layout design becomes inflexible. In the other method, the connection elastic sheet and an injection-molded product are assembled together by means of a plug-in structure. However, in this method, although the position where the connection elastic sheet is arranged can be selected flexibly, such as arranged at the middle of the product, the assembling accuracy is lower, and the connection is not firm. Therefore, it is very necessary to provide an injection molding method capable of arranging the connection elastic sheet at the middle of the injection-molded product to improve the arranging flexibility of the connection elastic sheet and ensure the connecting reliability between the connection elastic sheet and the product.

SUMMARY

An objective of embodiments of the present disclosure is to provide an injection molding method for a product with a connection elastic sheet to enable the connection elastic sheet to be arranged at the middle of the injection-molded product.

According to a first aspect of the present disclosure, there is provided an injection molding method for a product with a connection elastic sheet, the method comprising the following steps:

providing a blank material of the connection elastic sheet, wherein the blank material comprises at least one connection piece and a material connection strip connected to the at least one connection piece, and each connection piece comprises an elastic arm portion and a wire portion following the elastic arm portion;

positioning the blank material as an insert in a first injection mold by means of the material connection strip, wherein a section of the wire portion of each connection piece that is adjacent to and corresponding to the elastic arm portion is located in a first injection cavity of the first injection mold, and the material connection strip, a remaining section of the wire portion of each connection piece, and the elastic arm portion of each connection piece is sealed in a portion of the first injection mold that surrounds the first injection cavity;

injecting a first injection plastic part into the first injection cavity to obtain a first injection product;

processing the first injection product for deforming the blank material to the connection elastic sheet, wherein the processing comprises bending up the elastic arm portion of each connection piece toward an outer surface of the first injection plastic part, to enable the elastic arm portion of each connection piece to be gathered within a range surrounded by a rim of the outer surface;

placing the processed first injection product into a second injection cavity of a second injection mold, and sealing the elastic arm portion of each connection piece with a fitting between the rim and the second injection mold; and injecting a second injection plastic part into the second injection cavity to obtain the product with the connection elastic sheet.

Optionally, the processing further comprises removing the material connection strip.

Optionally, when the first injection plastic part is injected into the first injection cavity, a positioning hole is formed on the outer surface of the first injection plastic part; and the positioning hole is configured to cooperate with a positioning post of the second injection mold to position the processed first injection product when the processed first injection product is placed in the second injection cavity of the second injection mold.

Optionally, when the first injection plastic part is injected into the first injection cavity, a bend guide protrusion corresponding to the elastic arm portion of each connection piece is formed on the outer surface of the first injection plastic part; and the bend guide protrusion is configured to allow a bent portion of the corresponding elastic arm portion to attach thereto when the elastic arm portion of each connection piece is bent up toward the outer surface of the first injection plastic part.

Optionally, when the first injection plastic part is injected into the first injection cavity, a baffle wall for separating the elastic arm portion of each connection piece from each other is formed on the outer surface of the first injection plastic part.

Optionally, when the first injection plastic part is injected into the first injection cavity, a reinforcing rib is formed on a side face of the first injection plastic part; and the reinforcing rib is configured to be covered by the second injection plastic part when the second injection plastic part is injected into the second injection cavity.

According to a second aspect of the present disclosure, there is also provided a speaker, comprising a voice coil, and a housing formed by the injection molding method according to the first aspect of the present disclosure, wherein the connection elastic sheet of the housing comprises two connection pieces; the wire portion of one of the connection pieces is electrically connected to a lead wire of the voice coil, and the wire portion of the other connection piece is electrically connected to another lead wire of the voice coil; and the two elastic arm portions of the connection elastic sheet are located on a side of the outer surface of the housing.

Optionally, the two elastic arm portions are opposite to each other.

Optionally, the plastic part of the housing surrounds the two elastic arm portions.

According to a third aspect of the present disclosure, there is also provided an electronic device, comprising a speaker according to the second aspect of the present disclosure, wherein the speaker connects the voice coil to a circuit of the electronic device by means of the connection elastic sheet.

A beneficial effect of the present disclosure is as follows. In the injection molding method of the present disclosure, first, the first injection product comprising the first injection plastic part and the blank material of the connection elastic sheet is obtained by means of the first injection molding; second, with respect to the first injection product, the blank material is processed to form the connection elastic sheet; and third, the second injection plastic part is injected by taking the processed first injection product as the insert to obtain the product with the connection elastic sheet. When the second injection plastic part is injected, the elastic arm portion can be sealed by the rim, surrounding the elastic arm portion of the connection elastic sheet, of the first injection plastic part, so that the purpose of arranging the elastic arm portion of the connection elastic sheet at the middle of the injection-molded product can be realized by the injection molding method provided by the present disclosure.

Further features of the present disclosure and advantages thereof will become apparent from the following detailed description of exemplary embodiments according to the present disclosure with reference to the accompanying drawings.

BRIEF DESCRIPTION OF THE DRAWINGS

The accompanying drawings, which are incorporated in and constitute a part of the description, illustrate embodiments of the present disclosure and, together with the description thereof, serve to explain the principles of the present disclosure.

Figure 1:
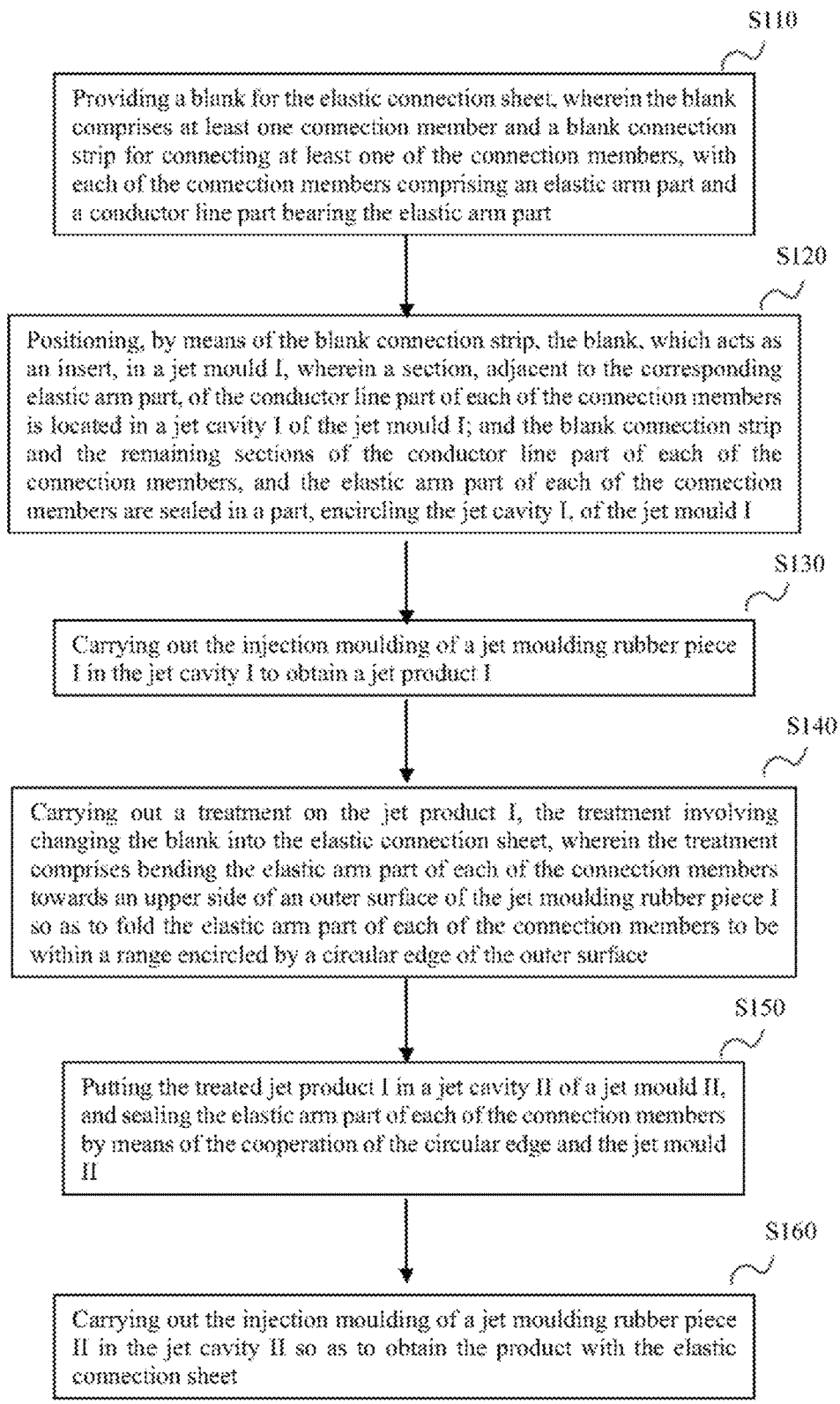
FIG. 1 is a schematic flow chart of an injection molding method according to an embodiment of the present disclosure.

The reference signs represent the following components: 100—blank material; 110, 110a, 110b—connection piece; 111—elastic arm portion; 112—wire portion; 1121—connection terminal; 120—material connection strip; 121—positioning hole; 113—positioning portion of the connection piece; 200—first injection plastic part; 210—outer surface of the first injection plastic part; 211—rim; 220—positioning hole; 230—bend guide protrusion; 240—baffle wall; 250—reinforcing rib; 100'—connection elastic sheet; 300—first injection product; 300'—processed first injection product; 400—second injection plastic part; and 500—product with the connection elastic sheet.

DETAILED DESCRIPTION

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the present disclosure, its application, or uses.

Techniques, methods and apparatus as known by one of ordinary skill in the relevant art may not be discussed in detail but are intended to be part of the description where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed in the accompanying drawings.

FIG. 1 is a schematic flow chart of an injection molding method for a product with a connection elastic sheet according to an embodiment of the present disclosure.

As shown in FIG. 1, the injection molding method according to the embodiment of the present disclosure can comprise the following steps performed in sequence.

Figure 2:
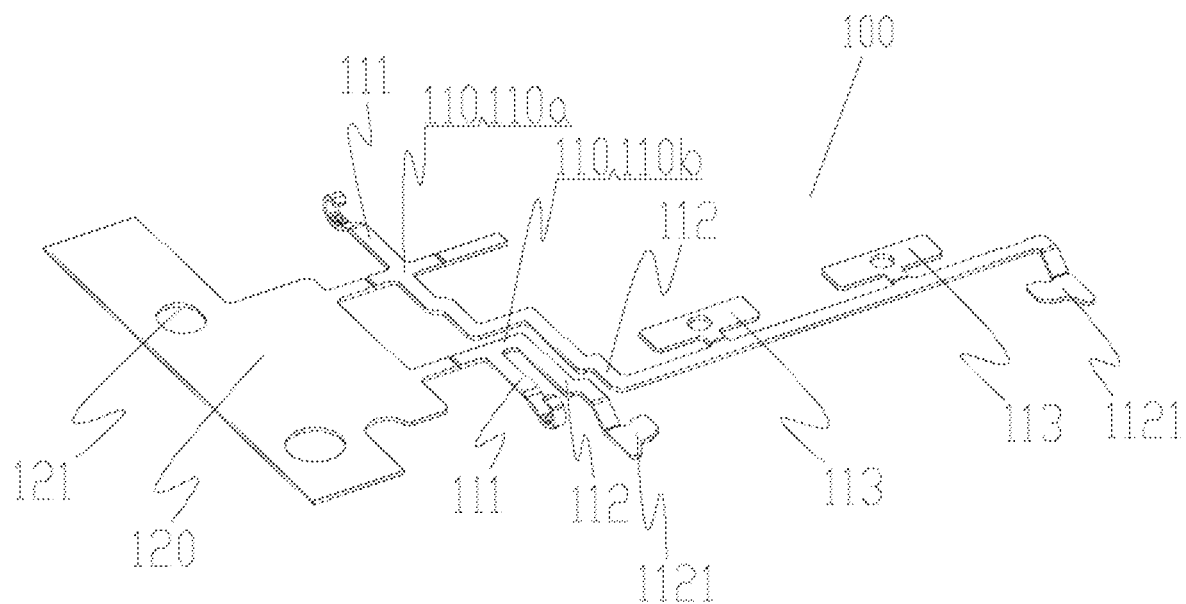
FIG. 2 is a schematic structure view of a blank material in the injection molding method according to the embodiment of the present disclosure.

In step S110, a blank material 100 of a connection elastic sheet as shown in FIG. 2 is provided.

The blank material 100 comprises at least one connection piece 110 and a material connection strip 120 connected to the at least one connection piece 110.

In an embodiment in which the blank material 100 comprises two or more connection pieces 110, all the connection pieces 110 are connected together to form an integrated body by means of the material connection strip 120.

The number of the connection piece(s) 110 of the blank material 100 can be set according to a requirement of the product.

In an embodiment in which the blank material 100 comprises one connection piece, the number of the blank material(s) 100 can be determined according to a requirement of the product.

In an embodiment shown in FIG. 2, the blank material 100 comprises two connection pieces 110, namely a connection piece 110a and a connection piece 110b.

Each connection piece 110 comprises an elastic arm portion 111 and a wire portion 112 following the elastic arm portion 111.

The tail end of the wire portion 112 is a connection terminal 1121 which is configured to connect an internal apparatus of the product to the corresponding connection piece 110. Taking a speaker product as an example, the connection terminal 1121 is configured to connect a lead wire of a voice coil to the corresponding connection piece 110.

In step S120, the blank material 110 as an insert is positioned by means of the material connection strip 120 in a first injection mold.

A positioning hole 121 is formed in the material connection strip 120, and is configured not only for automatically transport of the blank material 100 but also for positioning the blank material 100 relative to the first injection mold. Correspondingly, the first injection mold is provided with a positioning post adapted to the positioning hole 121.

In order to improve the positioning accuracy of the blank material 110 in the first injection mold, at least a partial connection piece 110 of the blank material 100 may further comprise a positioning portion connected to the elastic arm portion 111 and/or the wire portion 112; and a positioning hole is further formed in the positioning portion. In this way, the positioning of the blank material 100 relative to the first injection mold can be performed under the combined action of the positioning portion and the material connection strip 120. Correspondingly, the first injection mold is further provided with another positioning post adapted to the positioning hole in the positioning portion.

In the embodiment shown in FIG. 2, as the wire portion 112 of the connection piece 110a is longer than the wire portion 112 of the connection piece 110b, the connection piece 110a is provided with a positioning portion 113 connected to the wire portion 112 to improve the positioning accuracy of the connection piece 110a in the injection mold.

Figure 3:
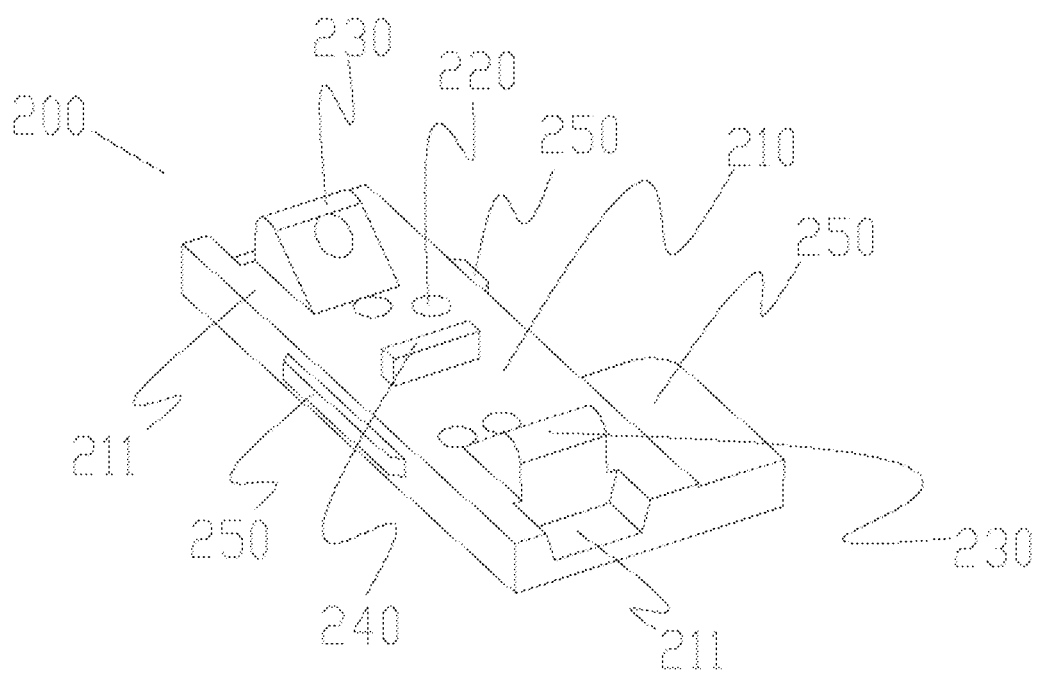
FIG. 3 is a schematic structure view of a first injection plastic part in the injection molding method according to the embodiment of the present disclosure.
Figure 4:
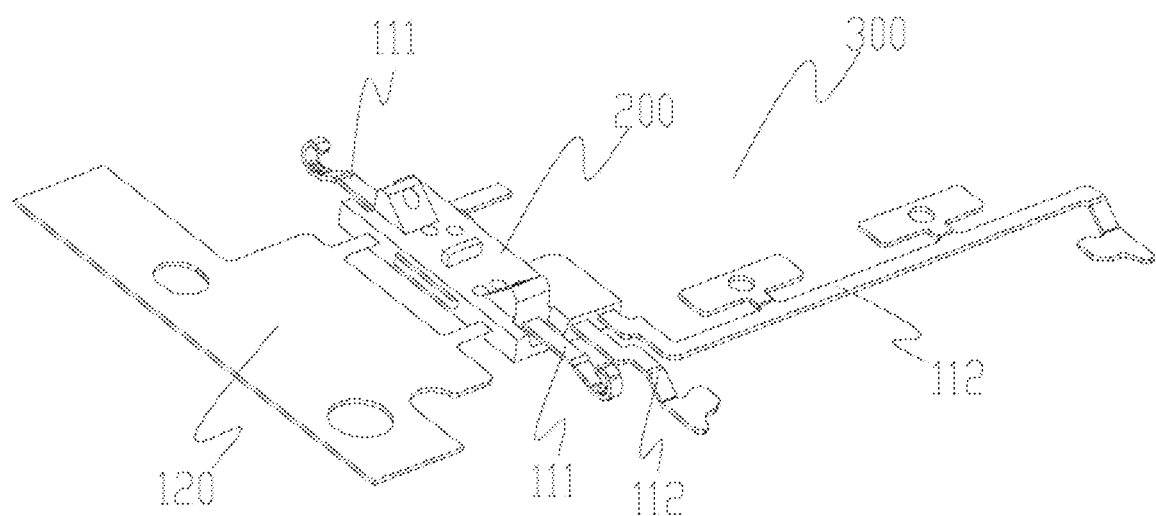
FIG. 4 is a schematic structure view of a first injection product comprising the blank material shown in FIG. 2 and the first injection plastic part shown in FIG. 3.

In step S120, a section, adjacent to and corresponding to the elastic arm portion 111, of the wire portion 112 of each of the connection pieces 110a and 110b is located in a first injection cavity of the first injection mold. It indicates that when a first injection plastic part 200 is injected into the first injection mold to be molded as shown in FIG. 3, the first injection plastic part 200 wraps this section of each of the connection pieces 110a and 110b, and combines with each of the connection pieces 110a and 110b to form a first injection product 300 as shown in FIG. 4.

In step S120, the material connection strip 120, a remaining section of the wire portion 112 of each of the connection pieces 110a and 110b, and the elastic arm portion 111 of each of the connection pieces 110a and 110b are sealed in a portion of the first injection mold that surrounds the first injection cavity, to prevent overflowing of molten material of the first injection plastic part 200 from the first injection cavity.

For the blank material 100 shown in FIG. 2, the positioning portion 113 of the connection piece 110a is connected to the remaining section of the wire portion 112, to further seal the positioning portion 113 in the portion of the first injection mold that surrounds the first injection cavity.

Correspondingly, profiling grooves corresponding to the all sealed portions may be formed at positions of the first injection mold which surround the first injection cavity.

In step S130, the first injection plastic part is injected into the first injection cavity to obtain the first injection product 300 which is as shown in FIG. 4 and which comprises the blank material 100 and the first injection plastic part 200.

According to FIG. 4, the shape of the first injection plastic part 200 corresponds to that of the first injection cavity of the first injection mold, and the above sealed portions are located outside the first injection plastic part 200.

Figure 5:
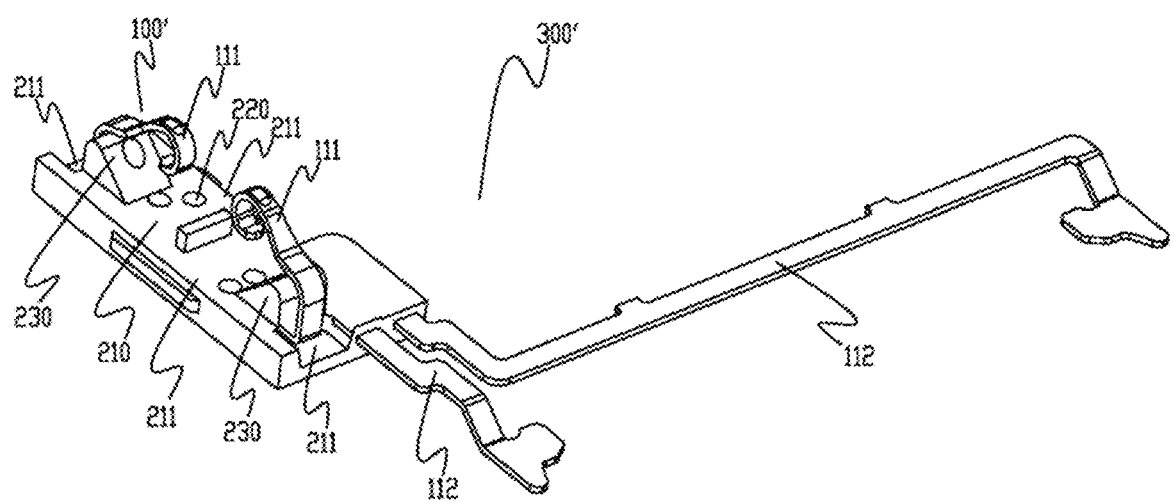
FIG. 5 is a schematic structure view of a processed first injection product.

In step S140, the obtained first injection product 300 is subjected to processing of deforming the blank material 100 to the connection elastic sheet 100' as shown in FIG. 5 to obtain the processed first injection product 300'.

The processing comprises bending up the elastic arm portion 111 of each of the connection pieces 110a and 110b toward an outer surface 210 of the first injection plastic part 200 to enable the elastic arm portion 111 of each of the connection pieces 110a and 110b to be gathered within a range surrounded by a rim 211 of the outer surface 210.

The processing further comprises: removing the material connection strip 120 from the blank material 100 in the first injection product 300.

By removing the material connection strip 120, on one hand, the material connection strip 120 will not occupy an internal space of the second injection plastic part; and on the other hand, in the embodiment in which the blank material 100 comprises two or more connection pieces 110a and 110b, the connection pieces 110a and 110b are independent of each other, and are insulated from each other by means of the first injection plastic part 200.

The processing may further comprise: removing the positioning portion 113 from the blank material 100 in the first injection product 300.

Further, in order to guide the bending elastic arm portion 111 in step S140 to improve the consistency of the connection elastic sheet 100', when the first injection plastic part 200 is injected into the first injection cavity, each of bend guide protrusions 230 corresponding to each of the elastic arm portions 111 of the connection pieces 110a and 110b is formed on the outer surface 210 of the first injection plastic part 200. Correspondingly, recesses corresponding to the all bend guide protrusions 230 are formed in the first injection cavity of the first injection mold.

Each bend guide protrusion 230 is configured to allow a bent portion of the corresponding elastic arm portion 111 to attach when the elastic arm portion 111 of each of the connection pieces 110a and 110b is bent up toward the outer surface 210 of the first injection plastic part 200.

Further, in order to avoid the problem that the two elastic arm portions 111 are in contact with each other due to a pressure when the electrical contact connection is performed through the connection elastic sheet 100', a baffle wall 240 for separating the elastic arm portions 111 of the connection pieces 110a and 110b is formed on the outer wall 210 of the first injection plastic part 200. Correspondingly, a recess corresponding to the baffle wall 240 is formed in the first injection cavity of the first injection mold. This structure is advantageous in improving the structural compactness of the connection elastic sheet 100'.

In step S150, the processed first injection product 300' is placed in a second injection cavity of a second injection mold, and the elastic arm portion 111 of each of the connection pieces 110a and 110b is sealed with the fitting between the rim 210 of the first injection plastic part 200 and the second injection mold.

In step S150, due to the fitting between the rim 210 and the second injection mold, other structures such as the above bend guide protrusion 230 and the baffle wall 240, surrounded by the rim 210, of the first injection plastic part 200 can be sealed.

Further, in order to improve the positioning accuracy of the processed first injection product 300' in the second injection mold, as shown in FIG. 3 to FIG. 5, when the first injection plastic part 200 is injected into the first injection cavity, a positioning hole 220 is formed in the outer surface 210 of the first injection plastic part 200.

The positioning hole 220 is configured to cooperate with a positioning post of the second injection mold to position the processed first injection product 300' when the processed first injection product 300' is placed in the second injection cavity of the second injection mold.

The positioning hole 220 may be cylindrical, or may be in a shape of a non-rotating body such as a square.

Figure 6:
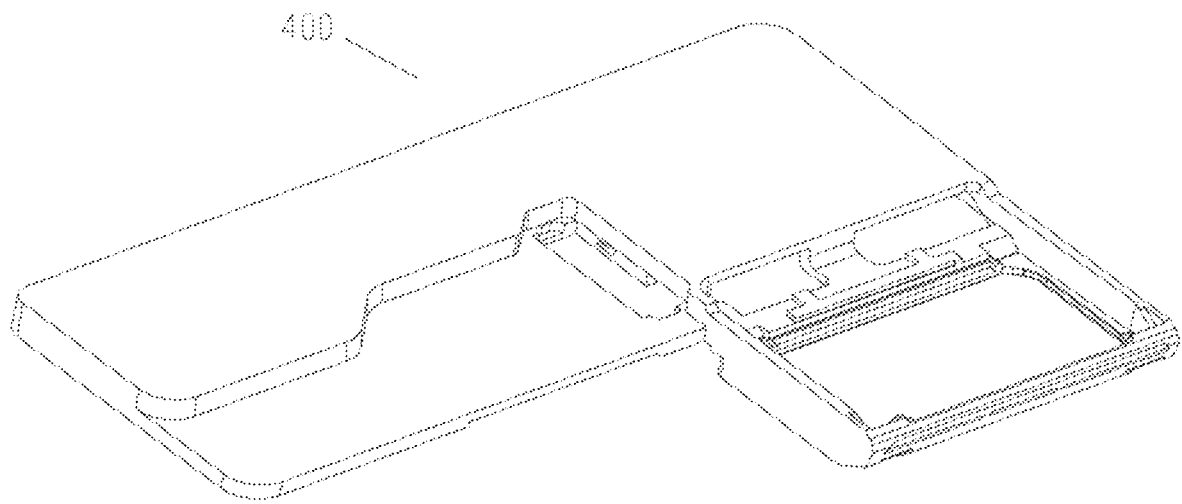
FIG. 6 is a schematic structure view of a second injection plastic part in the injection molding method according to the embodiment of the present disclosure.
Figure 7:
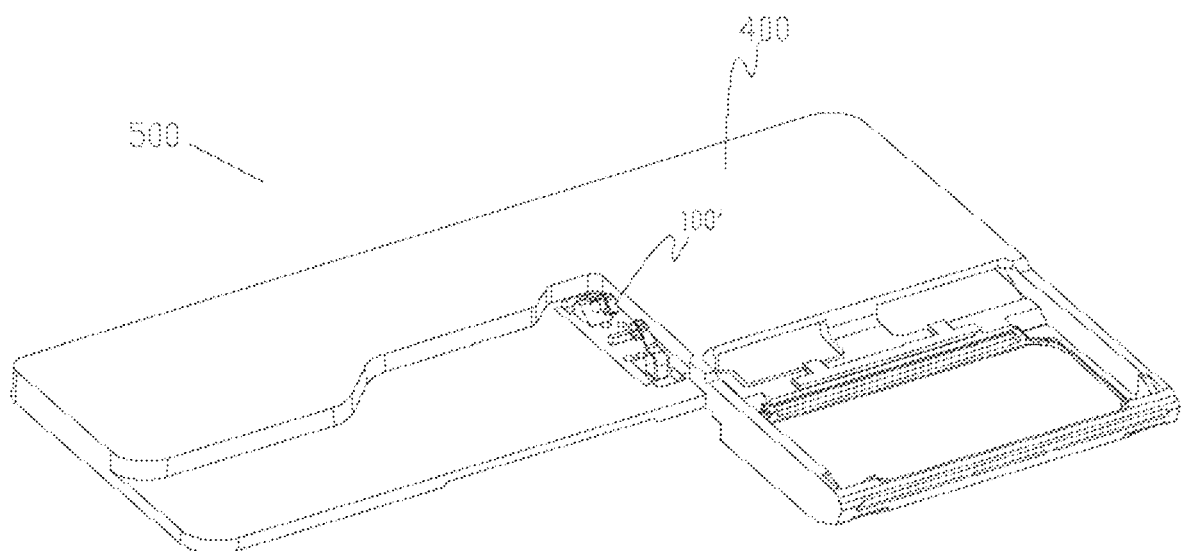
FIG. 7 is a schematic structure view of a product with a connection elastic sheet obtained after second injection molding.

In step S160, after the second injection plastic part 400 shown in FIG. 6 is injected into the second injection cavity, the product 500 which is as shown in FIG. 7 and which has the connection elastic sheet 100' is obtained.

The product 500 comprises the connection elastic sheet 100' and the second injection plastic part 400; and the second injection plastic part 400 is combined with the first injection plastic part 200.

In order to improve the combining strength between the second injection plastic part 400 and the first injection plastic part 200, as shown in FIG. 3 to FIG. 5, when the first injection plastic part 200 is injected into the first injection cavity, a reinforcing rib 250 may be formed on a side face of the first injection plastic part 200.

The reinforcing rib 250 is configured to be covered by the second injection plastic part when the second injection plastic part is injected into the second injection cavity.

It can be seen that the plastic portion of the product 500 with the connection elastic sheet 100' in the present disclosure is formed by two injection moldings, and the plastic portion comprises the first injection plastic part 200 obtained by the first injection molding and the second injection plastic part 400 obtained by the second injection molding. By means of the two injection moldings, the first injection plastic part 200 can be placed in the second injection cavity during the second injection molding, and the sealing of the elastic arm portions 111 of the connecting the elastic sheet 100' with respect to the second injection cavity can be realized, so that the purpose of arranging the connection elastic sheet 100' at the middle of the product 500 can be realized.

Any product with the connection elastic sheet, such as a housing of a speaker, can be formed by the injection molding method of the present disclosure.

According to another aspect of the present disclosure, there is also provided a speaker, comprising a voice coil, and a housing formed by the injection molding method of the present disclosure. The connection elastic sheet 100' of the housing comprises two connection pieces 110a and 110b. A wire portion 112 of the connection piece 110a is electrically connected to one lead wire of the voice coil via, for example, a connection terminal 1121; and a wire portion 112 of the connection piece 110b is electrically connected to the other lead wire of the voice coil via, for example, the connection terminal 1121.

The two elastic arm portions 111 of the connection elastic sheet 100' are located on one side of the outer surface of the housing, so as to connect the voice coil to an external circuit through the elastic arm portions 111.

The speaker may be a speaker unit or a speaker module.

The two elastic arm portions 111 of the connection elastic sheet 100' of the speaker may be opposite to each other.

According to the injection molding method of the present disclosure, the plastic part of the housing of the speaker can surround the two elastic arm portions 111. It indicates that the two elastic arm portions 111 can be located at the middle of the housing instead of only being located at the edge of the housing.

According to a third aspect of the present disclosure, there is also provided an electronic device, comprising the speaker according to the present disclosure, wherein the speaker connects the voice coil to a circuit of the electronic device through the connection elastic sheet 100'.

For example, a circuit board of the electronic device comprises each of bonding pads corresponding to each of the two connection pieces of the connection elastic sheet 100' of the speaker; and the elastic arm portions 111 of the two connection pieces are in electrical contact with the corresponding bonding pads to connect the voice coil of the speaker to an external circuit to drive the speaker to produce a sound.

The above embodiments mainly focus on the differences from other embodiments, though those skilled in the art should clearly understand that the above embodiments may be used separately or in combination with one another as needed.

Although some specific embodiments of the present disclosure have been demonstrated in detail with examples, it should be understood by a person skilled in the art that the above examples are only intended to be illustrative but not to limit the scope of the present disclosure. It should be understood by those skilled in the art that the above embodiments can be modified without departing from the scope and spirit of the present disclosure. The scope of the present disclosure is defined by the appended claims.

The invention claimed is:

1. An injection molding method for a product with a connection elastic sheet, comprising:
    providing a blank material of the connection elastic sheet, wherein the blank material comprises at least one connection piece and a material connection strip connected to the at least one connection piece, and the at least one connection piece comprises an elastic arm portion and a wire portion following the elastic arm portion;
    positioning the blank material as an insert in a first injection mold by the material connection strip, wherein a section of the wire portion of the at least one connection piece that is adjacent to and corresponding to the elastic arm portion is located in a first injection cavity of the first injection mold, and wherein the material connection strip, a remaining section of the wire portion of the at least one connection piece, and the elastic arm portion of the at least one connection piece are sealed in a portion of the first injection mold that surrounds the first injection cavity;
    injecting a first injection plastic part into the first injection cavity to obtain a first injection product;
    processing the first injection product for deforming the blank material to the connection elastic sheet, wherein the processing comprises bending up the elastic arm portion of the at least one connection piece toward an outer surface of the first injection plastic part, to provide for gathering of the elastic arm portion of the at least one connection piece within a range surrounded by a rim of the outer surface;
    placing the processed first injection product into a second injection cavity of a second injection mold, and sealing the elastic arm portion of each connection piece with a fitting between the rim and the second injection mold; and
    injecting a second injection plastic part into the second injection cavity to obtain the product with the connection elastic sheet.

2. The injection molding method of claim 1, wherein the processing further comprises removing the material connection strip.

3. The injection molding method of claim 1, wherein when the first injection plastic part is injected into the first injection cavity, a positioning hole is formed on the outer surface of the first injection plastic part; and the positioning hole is configured to cooperate with a positioning post of the second injection mold to position the processed first injection product when the processed first injection product is placed in the second injection cavity of the second injection mold.

4. The injection molding method of claim 1, wherein when the first injection plastic part is injected into the first injection cavity, a bend guide protrusion corresponding to the elastic arm portion of the at least one connection piece is formed on the outer surface of the first injection plastic part; and the bend guide protrusion is configured to allow a bent portion of the corresponding elastic arm portion to attach thereto upon bending of the elastic arm portion of the at least one connection piece up toward the outer surface of the first injection plastic part.

5. The injection molding method of claim 1, wherein when the first injection plastic part is injected into the first injection cavity, a baffle wall for separating the elastic arm portion of the at least one connection piece from elastic arm portions of other connection pieces, if any, is formed on the outer surface of the first injection plastic part.

6. The injection molding method of claim 1, wherein when the first injection plastic part is injected into the first injection cavity, a reinforcing rib is formed on a side face of the first injection plastic part; and the reinforcing rib is configured to be covered by the second injection plastic part when the second injection plastic part is injected into the second injection cavity.

\* \* \* \* \*